UNITED STATES PATENT OFFICE.

FREDERIC C. BOWMAN, OF NEW YORK, N. Y., ASSIGNOR TO GENERAL CHEMICAL COMPANY, OF NEW YORK, N. Y., A CORPORATION OF NEW YORK.

METHOD OF PRODUCING SODIUM FLUORID.

1,324,030.

Specification of Letters Patent.

Patented Dec. 9, 1919.

No Drawing.

Application filed March 9, 1918. Serial No. 221,380.

*To all whom it may concern:*

Be it known that I, FREDERIC C. BOWMAN, a citizen of the Dominion of Canada, and resident of the city of New York, county of Bronx, and State of New York, have invented a certain new and useful Improvement in Methods of Producing Sodium Fluorid, of which the following is a specification.

My invention relates to an economical method of producing sodium fluorid from sodium fluosilicate.

I have discovered that if sodium fluosilicate suspended in a suitable medium, for instance water, is suitably treated with a suitable compound of sodium, sodium fluorid substantially free from silica will separate in crystalline form. I have further discovered that, by fractional settling, I can recover these sodium fluorid crystals in a very simple, efficient and rapid manner.

As the sodium compound I may employ suitable sodium compounds, for instance sodium bicarbonate, caustic soda, or, preferably, sodium carbonate, and when I refer hereinafter to "soda," I include in such term the substances just named, as well as any other sodium compounds which act in an equivalent manner in the reaction.

The sodium compound may be, and preferably is, added in the form of a solution, to the sodium fluosilicate suspension with stirring, at such a rate that the mixture does not show an alkaline reaction, for instance, with phenolphthalein, even temporarily, until a slight excess of the amount of the sodium compound required for neutralization of substantially all the sodium fluosilicate present has been added—for instance, when sodium carbonate is employed, a little more than 11.3 parts by weight of anhydrous sodium carbonate to ten (10) parts by weight of sodium fluosilicate.

The sodium compound need not be added in the form of a solution, but, for instance, when sodium bicarbonate is used, may be added in dry form, for example, in the form of a very fine powder. The following is an example of a specific process embodying my invention, which latter is, of course, not limited to the materials, proportions or conditions mentioned in such example. The parts are given by weight.

To one thousand (1000) parts of hot water I add ninety-five (95) parts of sodium fluosilicate to form a suspension. I gradually add to such suspension one hundred and five (105) parts of soda ash dissolved in five hundred (500) parts of hot water, the addition of the soda ash solution to the suspension being at such a rate that the mixture reacts continuously either acid or neutral (with for instance litmus) until practically all of the soda ash has been added. The mixture is maintained at a temperature of about 205° F., and agitated constantly during such addition, and for a short time thereafter. When the agitation is stopped, sodium fluorid crystals, which are usually larger and heavier than the silica particles settle out first, and when these have substantially all settled out, and before the silica has settled, the mother liquor, holding the silica, is drawn off. The proper time to draw off the mother liquor may be readily determined by the appearance of the suspension liquid. The sodium fluorid so obtained may be freed from any silica particles which may have settled with them, (usually a very small quantity only if the process has been carefully carried out) by repeating this fractional settling process, using preferably the mother liquor (substantially freed from suspended silica) as the suspension medium.

By using the mother liquor, instead of a fresh supply of water, as such suspension medium, the yield of sodium fluorid recovered is increased, none, or substantially none of it, going into the solution with the mother liquor.

The sodium fluorid crystals which I have obtained by the above process were of subtially the following composition, the proportion being given by weight:

Sodium fluorid_____ 98.26%
Sodium fluosilicate_____ 1.18%
Free silica and insoluble matter___ .56%

In the commercial practice of my invention it is advantageous to use as the suspension medium for the sodium fluosilicate, the mother liquor from which the silica has been removed, so as to increase the yield of sodium fluorid, and avoid the formation of excessive amounts of mother liquor.

I have found that the full benefit of my process is obtained only if the soda is added at such a rate that the mixture is continuously either neutral, or acid, for instance, to litmus, and that such full benefit is not obtained if the soda is added at a rate so fast that the mixture as a whole reacts even temporarily alkaline, for instance, to phenolphthalein, at least until all the soda has been added. I do not mean to imply that a product commercially suitable for certain purposes might not be obtained economically by having a temporary alkaline condition prevail particularly during the addition of the fourth quarter of the quantity of soda required for neutralization. I believe that by adding the soda so slowly as to avoid an alkaline reaction, such soda acts only upon the sodium fluosilicate in solution, the suspended sodium fluosilicate gradually going into the solution as the sodium fluosilicate already in solution reacts. I desire it to be understood, however, that while I believe that this is what occurs, I do not limit my invention by my statement of this theory. Of course, at the point at which the soda is introduced an alkaline condition may temporarily prevail, owing to the large excess of uncombined soda at this point.

By my method the use of a large volume of water as a solvent for the sodium fluorid is rendered unnecessary, as also the employment of large apparatus, the handling of bulky volumes, and the use of heat to separate the sodium fluorid from the water in which it is soluble to the extent of about 5 per cent. (5%) only.

I do not, however, claim as my invention broadly the formation of sodium fluorid by causing soda to act upon sodium fluosilicate, as this method of forming sodium fluorid is old. (Berzelius, *Lehrbuch*, 5th ed. vol. 3, page 216—1845).

I claim:

1. The improvement in the art of producing sodium fluorid which comprises treating a suspension of sodium fluosilicate with soda at such a rate that the mixture remains acid or neutral, substantially as and for the purpose described.

2. The improvement in the art of producing sodium fluorid which comprises treating a suspension of sodium fluosilicate with soda at such a rate that the mixture remains acid or neutral and then separating from each other by fractional settling the sodium fluorid and silica thus formed, substantially as and for the purpose described.

3. The improvement in the art of producing sodium fluorid which comprises treating an aqueous suspension of sodium fluosilicate with a sodium carbonate solution at such a rate that the mixture remains acid or neutral to litmus until approximately sufficient sodium carbonate has been added to react with the sodium fluosilicate initially present substantially as and for the purpose described.

4. The improvement in the art of producing sodium fluorid which comprises agitating an aqueous suspension of sodium fluosilicate, adding a sodium carbonate solution to the suspension at such a rate that the mixture remains acid or neutral to litmus until approximately sufficient sodium carbonate has been added to react with all the sodium fluosilicate originally present, and separating the sodium fluorid by fractional settling substantially as and for the purpose described.

In testimony whereof I have hereunto set my hand.

FREDERIC C. BOWMAN.